United States Patent
Connolly et al.

(10) Patent No.: US 10,924,379 B1
(45) Date of Patent: Feb. 16, 2021

(54) METHOD AND DEVICE FOR CONTROLLING TRANSMISSION RATE OF A DEVICE UNDER TEST

(71) Applicant: Rohde & Schwarz GmbH & Co. KG, Munich (DE)

(72) Inventors: David Connolly, Columbia, MD (US); John True, Columbia, MD (US)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 16/519,822

(22) Filed: Jul. 23, 2019

(51) Int. Cl.
  *H04L 12/26* (2006.01)
  *H04L 12/24* (2006.01)
  *H04L 1/00* (2006.01)
  *H04L 1/16* (2006.01)

(52) U.S. Cl.
  CPC ............ *H04L 43/50* (2013.01); *H04L 1/0003* (2013.01); *H04L 1/0014* (2013.01); *H04L 1/1607* (2013.01); *H04L 41/0896* (2013.01); *H04L 43/065* (2013.01)

(58) Field of Classification Search
  None
  See application file for complete search history.

(56) References Cited

U.S. PATENT DOCUMENTS

| | | | |
|---|---|---|---|
| 2002/0101836 A1* | 8/2002 | Dorenbosch | H04L 29/12066 370/329 |
| 2011/0019759 A1* | 1/2011 | Stager | H04B 7/0617 375/267 |
| 2013/0223422 A1* | 8/2013 | Abraham | H04L 1/0029 370/338 |
| 2013/0235836 A1* | 9/2013 | Roh | H04L 1/0031 370/329 |
| 2017/0034003 A1* | 2/2017 | Shevach | H04L 1/0083 |
| 2018/0352606 A1 | 12/2018 | Kasagi et al. | |
| 2020/0007246 A1* | 1/2020 | Chang | H04W 72/085 |

FOREIGN PATENT DOCUMENTS

WO  WO-2019190650 A1 * 10/2019 .......... H04W 40/023

* cited by examiner

*Primary Examiner* — Jeffrey R Swearingen
(74) *Attorney, Agent, or Firm* — Ditthavong & Steiner P.C.

(57) ABSTRACT

A method for controlling transmission rate of a device under test (DUT) is provided. The method comprises the steps of establishing a connection to the DUT, transmitting an operating mode notification in order to adjust the operating bandwidth and/or spatial stream capabilities of the DUT, and receiving an acknowledgement notification from the DUT regarding the correct reception of the transmitted operating mode notification.

20 Claims, 5 Drawing Sheets

METHOD AND DEVICE FOR CONTROLLING TRANSMISSION RATE OF A DEVICE UNDER TEST

TECHNICAL FIELD

The invention relates to controlling transmission rate of a device under test, especially for wireless devices under test operating, especially in a wireless communication network according to the IEEE 802.11 standards.

BACKGROUND ART

Generally, the IEEE 802.11 standards cover protocols and operation of wireless local area networks (WLANs), whereby describing the physical layer and Media Access Control (MAC) layer of the OSI reference model. According to IEEE 802.11 standards, a Basic Service Set (BSS) supports an operating bandwidth (OBW) of 20, 40, 80 or 160 MHz and additionally supports multiple spatial streams, for instance from 1 to 8 simultaneous spatial streams. Within these limits, a device under test (DUT) may send packets at any channel bandwidth (CBW) using any number of spatial streams. Usually, a DUT may attempt to utilize the highest bandwidth as well as the highest modulation and coding scheme (MCS) available, along with the largest permissible number of spatial streams. Consequently, in order to measure DUT performance, particularly at lower OBWs and MCS's, external measures are required to be implemented in order to change the transmission properties of the DUT.

For example, the document US 2018/0352606 A1 shows a method for measuring characteristics of a wireless DUT with an arbitrary modulation scheme or an arbitrary coding rate by suppressing acknowledgement notifications towards the DUT.

Here, the acknowledgement notifications are not outputted to the DUT, resulting the DUT to reduce its MCS index for each halted acknowledgement notification. The process is carried out until the value of the received MCS index reaches to a predefined MCS index.

However, when an acknowledgement notification is suppressed, the DUT tends to reduce its MCS only. In order to reduce its bandwidth or number of spatial streams, all or most of the available MCS indexes are required to be attempted. Disadvantageously, when the DUT eventually reaches the lower bandwidth and/or spatial streams limit, it tends to remain at the lowest MCS index, presumably considering the higher MCS indexes unavailable due to the preceding acknowledgement notification suppressions. Therefore, transmission rate control of the DUT becomes impossible in practice, for instance to obtain transmission characteristics for a DUT that may operate with a higher MCS index but at a lower CBW and/or fewer spatial streams.

Another alternative is for the Access Point (AP) to teardown the Basic Service Set (BSS), reconfiguring the OBW and spatial stream configuration identical to the target CBW and spatial streams to be measured. This technique forces the DUT to re-acquire and re-associate the new BSS after the BSS has been enabled again, which takes significant time to complete.

Accordingly, there is a need to provide a method and a device for controlling transmission rate of a device under test, especially for testing all available CBWs along which the DUT may operate with a significantly reduced overall test time.

SUMMARY OF THE INVENTION

According to a first aspect of the invention, a method for controlling transmission rate of a device under test (DUT) is provided. The method comprises the steps of establishing a connection to the DUT, transmitting an operating mode notification in order to adjust the operating bandwidth and/or spatial stream capabilities of the DUT, and receiving an acknowledgement notification from the DUT regarding the correct reception of the transmitted operating mode notification.

Therefore, by using the Operating Mode Notification (OMN) or a similar Operating Mode Indication (OMI) allows a device, preferably an 802.11 device, to announce that it has temporarily suspended its ability to receive higher bandwidth and/or spatial stream frames. Consequently, the peer DUT, preferably acting as a station (STA), immediately avoids to transmit along the aforementioned higher bandwidths and/or spatial streams. Hence, the DUT will immediately move down to the target bandwidth and/or spatial streams following the reception of the OMN.

The OMN and OMI commands are IEEE standard commands that are not capable to adjust MCS of the DUT, however they can adjust the bandwidth and/or spatial stream capabilities of the DUT. Advantageously, the acknowledgement suppression technique can now be implemented to adjust the DUT to the target MCS, while avoiding the problem of the DUT getting stuck at a low MCS. Furthermore, all available CBWs can be tested by leaving the OBW set to the highest required value and without having to tear-down the BSS to reconfigure between CBW measurements, which significantly reduces the overall test time.

According to a first preferred implementation form of said first aspect of the invention, the method further comprises the step of comparing the modulation and coding scheme (MCS) obtained from the received acknowledgement notification from the DUT with a target MCS. Advantageously, the operating transmission rate and coding scheme are analyzed in real-time.

According to a second preferred implementation form of said first aspect of the invention, the method further comprises the step of transmitting an acknowledgement notification (ACK) with a corrupted frame check sequence (FCS) in order to influence the MCS. The transmitted ACK is corrupted, for instance by corrupting the FCS of the frame so that the DUT will receive the frame but discard it. This advantageously causes the DUT to modify its transmission rate.

According to a further preferred implementation form of said first aspect of the invention, the method further comprises the step of withholding the acknowledgement notification transmission to the DUT in order to influence the MCS. In addition or as an alternative to transmit a corrupted ACK, the transmission rate of the DUT can be advantageously modified by not sending an ACK at all, until the target MCS is reached.

According to a further preferred implementation form of said first aspect of the invention, the method further comprises the step of transmitting an acknowledgement notification with a valid FCS in order not to influence the MCS. Advantageously, an un-interrupted transmission can be achieved.

According to a further preferred implementation form of said first aspect of the invention, the method further comprises the step of transmitting an operating mode notification to the DUT in order to reset the operating bandwidth and/or spatial stream capabilities of the DUT. Advantageously, the transmission characteristics of the DUT can be reset with ease.

According to a further preferred implementation form of said first aspect of the invention, the connection is established by sending an Internet Control Message Protocol (ICMP) echo request to the DUT and by successively receiving an ICMP echo response from the DUT. Advantageously, the connection establishment is performed in a convenient manner.

According to a further preferred implementation form of said first aspect of the invention, the connection establishment process is repeated periodically. Advantageously, a high connection integrity is achieved.

According to a second aspect of the invention, a device for controlling transmission rate of a device under test (DUT) is provided. The device comprises a transmitting unit adapted to transmit an operation mode notification to the DUT in order to adjust the operating bandwidth and/or spatial stream capabilities of the DUT. The device further comprises a receiving unit adapted to receive an acknowledgement notification from the DUT regarding the correct reception of the transmitted operation mode notification.

Therefore, by means of the Operating Mode Notification (OMN), the device announces that it has temporarily suspended its ability to receive higher bandwidth and/or spatial stream frames. Hence, the DUT will immediately move down to the target bandwidth and/or spatial streams following the receipt of the OMN. Advantageously, the device can now implement acknowledgement suppression technique in order to adjust the DUT to the target MCS, while overcoming the problem of the DUT getting stuck at a low MCS.

According to a first preferred implementation form of said second aspect of the invention, the device further comprises a processing unit adapted to compare the modulation and coding scheme (MCS) obtained from the received acknowledgement notification from the DUT with a target MCS. Advantageously, the operating transmission rate and coding scheme are analyzed in real-time.

According to a second preferred implementation form of said second aspect of the invention, the transmitting unit is further adapted to transmit an acknowledgement notification with a corrupted frame check sequence (FCS) in order to influence the MCS. The transmitted ACK is corrupted, for instance by corrupting the FCS of the frame so that the DUT will receive the frame but discard it. This advantageously causes the DUT to modify its transmission rate.

According to a further preferred implementation form of said second aspect of the invention, the transmitting unit is further adapted to withhold the acknowledgement notification transmission to the DUT in order to influence the MCS. In addition or as an alternative to transmit a corrupted ACK, the device may withhold the transmission of an ACK until the target MCS is reached, thereby modifying the DUT transmission rate.

According to a further preferred implementation form of said second aspect of the invention, the transmitting unit is further adapted to transmit an acknowledgement notification with a valid FCS in order not to influence the MCS. Advantageously, an un-interrupted transmission can be achieved.

According to a further preferred implementation form of said second aspect of the invention, the transmitting unit is further adapted to transmit an operating mode notification to the DUT in order to reset the operating bandwidth and/or spatial stream capabilities of the DUT. Advantageously, the transmission characteristics of the DUT can be reset with ease.

According to a further preferred implementation form of said second aspect of the invention, the device is adapted to establish a connection with the DUT by sending an Internet Control Message Protocol (ICMP) echo request to the DUT and by successively receiving an ICMP echo response from the DUT. Advantageously, the connection establishment is performed in a convenient manner.

According to a further preferred implementation form of said second aspect of the invention, the connection establishment process is repeated periodically. Advantageously, a high connection integrity is achieved.

According to a further preferred implementation form of said second aspect of the invention, the device further comprises a memory unit adapted to store the received and target MCS. Advantageously, the device can repeatedly use the MCS data stored in the memory, which significantly improves the reliability and further reduces the overall test time.

According to a further preferred implementation form of said second aspect of the invention, the device further comprises a user interface, preferably a graphical user interface. In addition, the user interface is adapted to receive user data corresponding to the target MCS, target bandwidth and/or target spatial stream capabilities of the DUT. Advantageously, a user can define the target capabilities with ease through direct manipulation of the graphical elements.

According to a third aspect of the invention, a test system comprising a device according to the second aspect of the invention and a device under test (DUT) for controlling transmission rate of the DUT is provided. Furthermore, the test system operates as a part of a Basic Service Set (BSS) adapted to define a certain operating bandwidth and maximum number of spatial streams. Advantageously, this allows for a complete assessment of the DUT within the test system.

BRIEF DESCRIPTION OF THE DRAWINGS

Exemplary embodiments of the invention are now further explained with respect to the drawings by way of example only, and not for limitation. In the drawings.

DETAILED DESCRIPTION OF PREFERRED EMBODIMENTS

Reference will now be made in detail to the embodiments of the present invention, examples of which are illustrated in the accompanying drawings. Similar entities and reference numbers in different figures have been partially omitted. However, the following embodiments of the present invention may be variously modified and the range of the present invention is not limited by the following embodiments.

Figure 1:
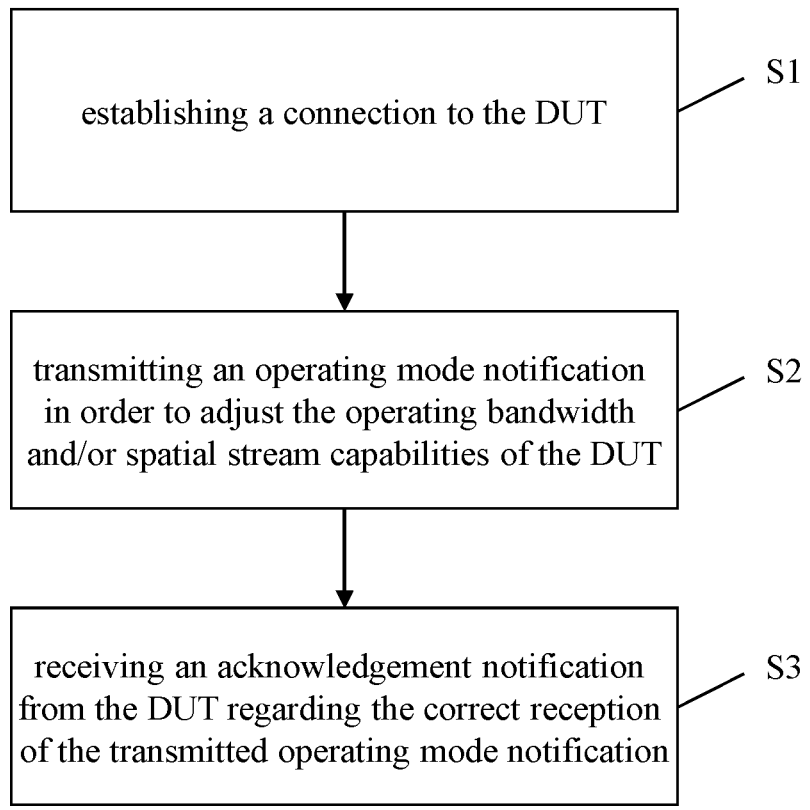
FIG. 1 shows an exemplary embodiment of the method according to the first aspect of the invention.

In FIG. 1, an exemplary embodiment of the method according to the first aspect of the invention is illustrated. In a first step S1, a connection to the DUT is established. In a second step S2, an operating mode notification is transmitted in order to adjust the operating bandwidth and/or spatial stream capabilities of the DUT. In a third step S3, an acknowledgement notification is received from the DUT regarding the correct reception of the transmitted operating mode notification.

In addition to this, the method further comprises the step of comparing the modulation and coding scheme (MCS) obtained from the received acknowledgement notification from the DUT with a target MCS.

Moreover, the method further comprises the step of transmitting an acknowledgement notification with a corrupted frame check sequence (FCS) in order to influence the MCS.

Additionally or alternatively, the method further comprises the step of withholding the acknowledgement notification transmission to the DUT in order to influence the MCS.

It might be further advantageous if the method further comprises the step of transmitting an acknowledgement notification with a valid FCS in order not to influence the MCS.

In addition to this, the method further comprises the step of transmitting an operating mode notification to the DUT in order to reset the operating bandwidth and/or spatial stream capabilities of the DUT.

Figure 2:
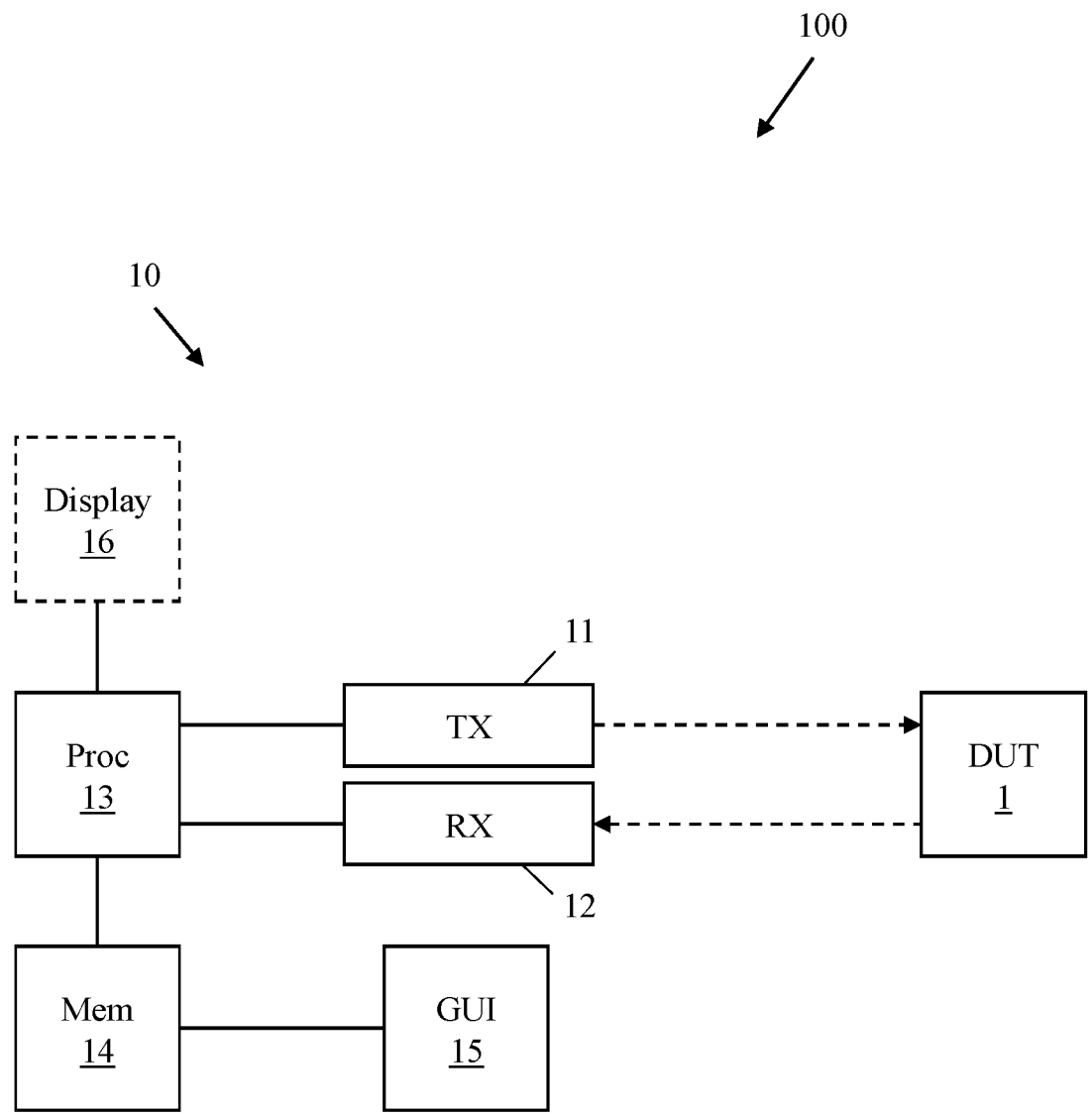
FIG. 2 shows an exemplary embodiment of the device according to the second aspect of the invention and the test system according to the third aspect of the invention in a block diagram.

In FIG. 2, an exemplary embodiment of the device 10 according to the second aspect of the invention and the test system 100 according to the third aspect of the invention are illustrated in a block diagram. The device 10 comprises a transmitting unit 11 and a receiving unit 12 in order to communicate with a DUT 1. The transmitting unit 11 and the receiving unit 12 can be separate entities comprising signal transmission and reception means with separate communicating antennas (not shown). Alternatively, the transmitting unit 11 and the receiving unit 12 may be formed as a single transceiver module, preferably connected to a single communicating antenna. The transmitting unit 11 and the receiving unit 12 establish a communication connection, preferably a wireless communication connection with the DUT 1 according to the IEEE 802.11 communication standard.

The device 10 further comprises a processing unit 13 connected to the transmitting unit 11 and the receiving unit 12, preferably via RF cables. The distance between the processing unit 13 and the transmitting and receiving units 11, 12 is kept very short in order to prevent signal degradation. The processing unit 13 comprises means to analyze received signal frames from the DUT 1, which are well-known in the art and therefore are not described herein in a greater details in order to avoid unnecessarily obscuring the invention. The processing unit 13 may also be referred to as microcontrollers, microprocessors, microcomputers, etc. The processing unit 13 may further be configured in hardware, firmware, software, or their combination.

The system 10 further comprises a memory unit 14, connected to the processing unit 13, in order to store the target indices. As an added advantage, the processing unit 13 can store the test results, for instance the MCS and OBW of the DUT 1, and can additionally utilize the results multiple times for further adjustment with respect to the comparison analysis. The memory unit 14 may further store programs required for signal processing and controlling of the processing unit 13 and temporarily store input and output information. The memory unit 14 may be implemented into a flash memory-type storage medium, a hard disc-type storage medium, a multimedia card micro-type storage medium, a card-type memory, a Random Access Memory (RAM), a Read-Only Memory (ROM), an Electrically Erasable Programmable Read-Only Memory (EEPROM), a Programmable Read-Only Memory (PROM), a magnetic memory, a magnetic disc, or an optical disk.

The system 10 further comprises a graphical user interface connected to the processing unit 13 through the memory unit 14. The connection is not necessarily required to be a wired connection, a wireless connection in the form of Wireless Local Area Network (WLAN), Web-based user interface and so on are also viable. Preferably, the graphical user interface 15 comprises menu based interfaces and direct manipulation interfaces so as to allow the users to configure the device 10 through the processing unit 13 to meet their specific requirements in diverse test circumstances.

The system 10 may further comprises a display 16 connected to the processing unit 13, in order to display a selective test result and the user defined test conditions, for instance the target MCS, OBW and/or spatial streams. The output to be displayed on the display 16 can be manipulated through a set of user instructions received, for instance via the graphical user interface 15 in real-time and/or via the memory unit 14 where the instructions are stored previously.

The device 10 together with the DUT 1 form an embodiment of the test system 100 according to the third aspect of the invention. The test system 100 operates as a part of a Basic Service Set (BSS) that defines a certain operating bandwidth and maximum number of spatial streams. In this context, the device 10 can be exemplified as a wireless local area network (WLAN) master or an Access Point (AP) and the DUT 1 can be exemplified as a WLAN slave or a Station (STA).

Alternatively, the device 10 may act as a WLAN slave and the DUT 1 may act as a WLAN master.

Figure 3:
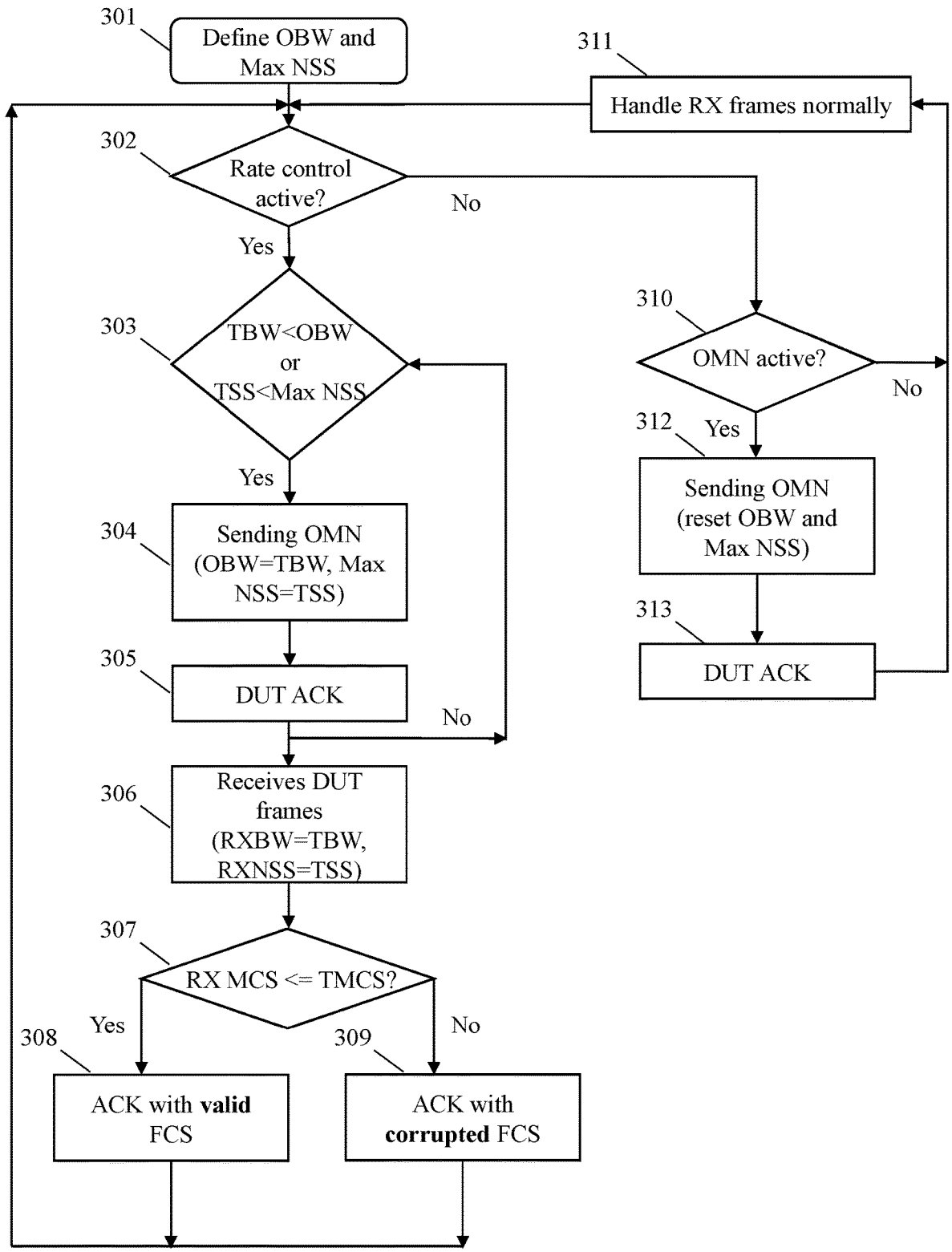
FIG. 3 shows a process flow chart of the test system.

In FIG. 3, a process flow chart of the test system is illustrated. The test system 100 defines 301 a certain Operating Bandwidth (OBW) and maximum number of spatial streams (Max NSS). If the transmission rate control 302 is active, the processing unit 13 of the device 10 compares the OBW and/or Max NSS with respect to the predefined target bandwidth (TBW) and target spatial streams (TSS) respectively as follows:

In the case where, $$TBW<OBW \text{ and/or}$$

$$TSS<Max\ NSS$$

the device 10 sends 304 operating mode notification (OMN) to the DUT 1 in order to change its OBW to TBW and Max NSS to TSS. The DUT 1 returns 305 acknowledgement notification (ACK) to confirm the reception of the OMN. Afterwards, the device 10 receives 306 frames from the DUT 1 with a reception bandwidth equal to the TBW and a reception spatial streams equal to the TSS.

In other cases, the transmission of OMN to the DUT 1 is skipped (304, 305) and the device 10 directly acquires 306 frames from the DUT 1 presuming a reception bandwidth equal to the TBW and reception spatial streams equal to the TSS.

Since the OBW and/or the spatial streams are successfully manipulated, the device 10 can thereby implement ACK suppression on the DUT 1 in order to influence its modulation and coding scheme (MCS). In this context, the processing unit 13 of the device 10 further compares 307 the received MCS (RX MCS) of the DUT 1, for instance received through the DUT ACK, with respect to the target MCS (TMCS).

In the case where,

RX MCS≤TMCS the device 10 transmits 308 ACK with valid frame check sequence (FCS) and the frame transmission between the device and the DUT 1 is continued un-interruptedly until the transmission rate of the DUT 1 is further required to be controlled 302.

However, in the case where,

RX MCS>TMCS the device 10 transmits 309 ACK with corrupted FCS so that the DUT 1 discards the received ACK and moves down to a lower MCS. Additionally or alternatively, the device 10 can withhold any ACK transmission so that the DUT 1 changes its transmission rate by itself. Although, the resulting effect of sending a faulty ACK and not sending an ACK at all may be in similar nature, which is to influence the DUT 1 transmission rate. It is however preferred to send a corrupted ACK to the DUT 1 since the overall signal transmission and reception seem to be closer to real-world scenario. In other words, transmission of a corrupted ACK looks almost identical to a normal operation when viewed, for example through signal analysis tools, whereas not sending ACK at all appears like the signaling may be substantially broken.

Furthermore, the behavior from the DUT's 1 point of view may differ based on whether the ACK is received or not, since the reception of the ACK, even if the FCS is corrupted, results in an indication that the original frame was received correctly. Therefore, the DUT 1 may act differently to adjust its transmission rate considering whether the frame failure is caused from an ACK that was corrupted or from no ACK reception at all.

Moreover, the device 10 performs reset operation on the DUT 1 in order to reset the transmission characteristics that are being altered. The device 10 checks 310 whether an OMN to the DUT 1 is active or not. If no OMN is active, the device 10 handles the DUT 1 frames normally. If there is an active OMN, for instance as indicated in step 304, the device 10 further transmits 312 an additional OMN in order to reset the OBW and MAX NSS to their starting values. Consequently, the DUT 1 returns 313 an ACK to confirm the new OMN reception and the device 10 handles 311 the DUT 1 frames normally.

Figure 4:
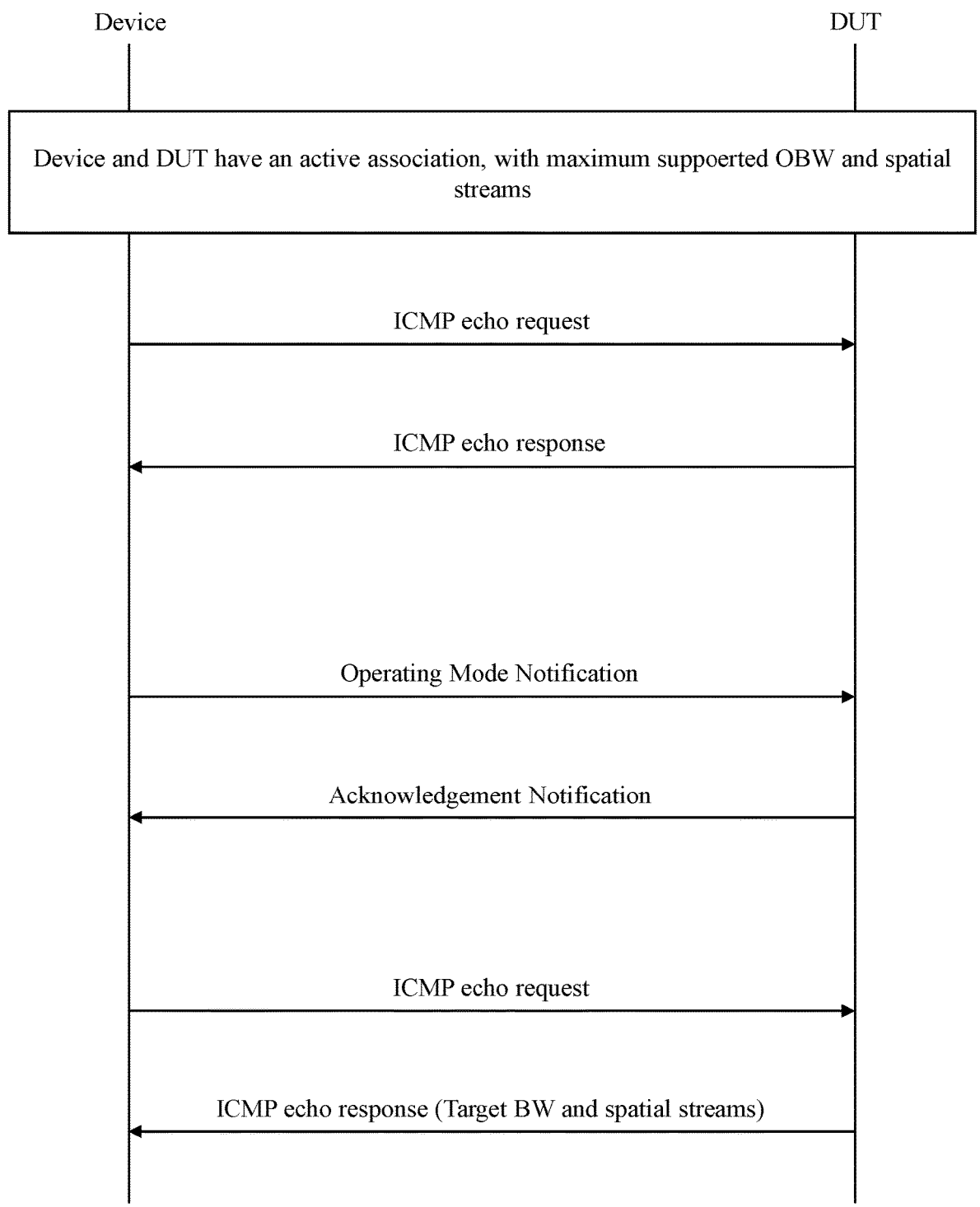
FIG. 4 shows an exemplary embodiment of frame transmission and reception for implementing Operating Mode Notification.

In FIG. 4, an exemplary embodiment of frame transmission and reception for implementing Operating Mode Notification (OMN) is illustrated. As already mentioned above, the test system 100 preferably acts as a part of a BSS where the device 10 and the DUT 1 may act as an AP and a STA respectively. In this context, the device 10 and the DUT 1 have an active association with maximum supported OBW and spatial streams. In order to establish a communication, the device 10 transmits an Internet Control Message Protocol (ICMP) echo request, for instance a ping request, to the DUT 1. The DUT 1 responds to the ICMP echo request with an ICMP echo response, for instance a ping response, towards the device 10. It is to be noted that, the DUT 1 tends to transmit the ICMP echo response conventionally by using the highest available bandwidth, spatial streams and MCS.

The device 10 transmits an OMN, thereby announcing a temporary reduction of reception bandwidth and/or spatial stream capability. The DUT 1 acknowledges the OMN with an acknowledgement notification (ACK). Hence, the device 10 may transmit further ICMP echo request to the DUT 1, where the DUT 1 responses using the target bandwidth and/or spatial streams, obtained from the OMN previously transmitted by the device 10.

At this point, ACK suppression technique can be advantageously utilized in order to reduce MCS while avoiding getting stuck at low MCS. It is important to note that the ICMP echo request and the ICMP echo response are repeated periodically.

Figure 5:
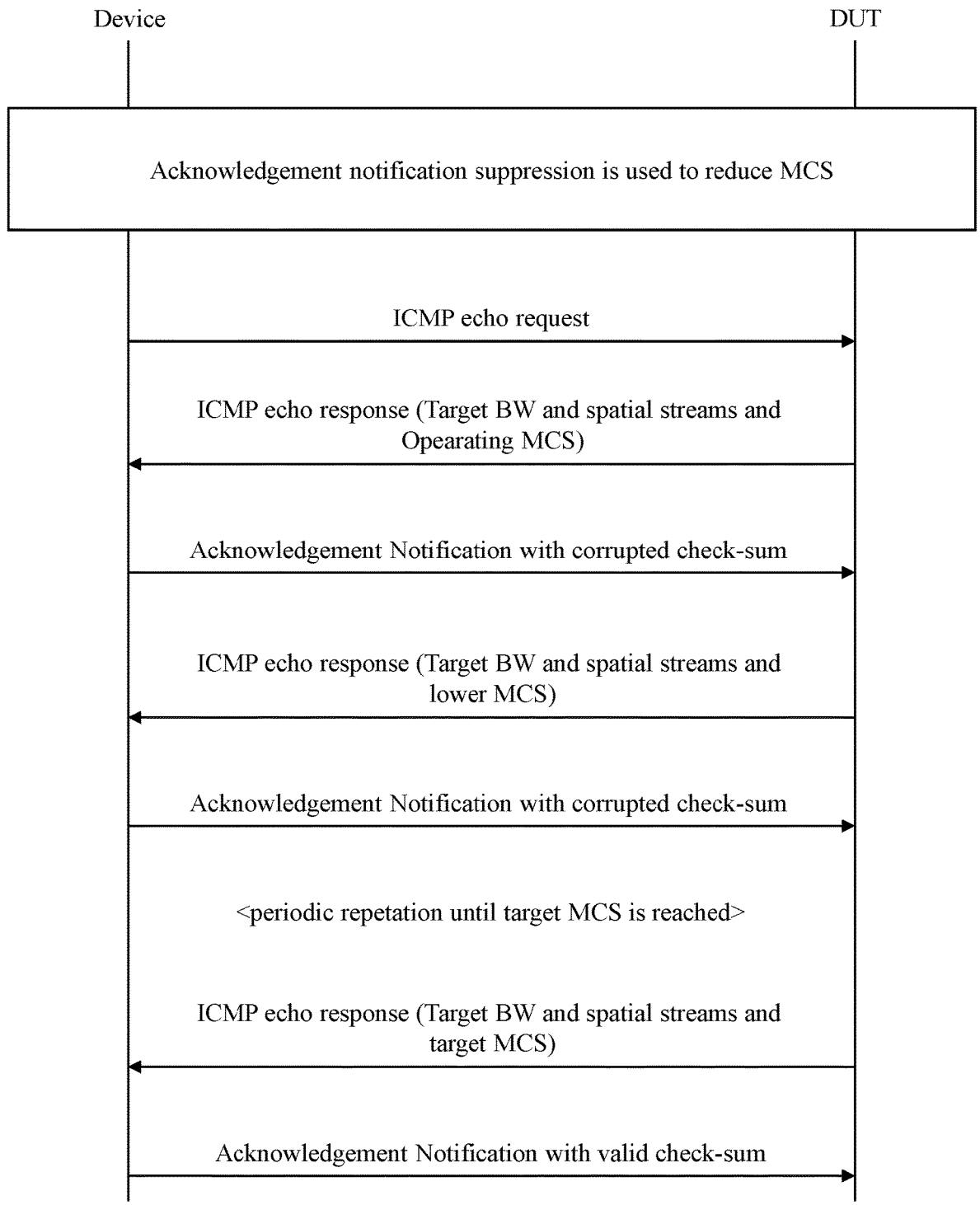
FIG. 5 shows an exemplary embodiment of frame transmission and reception for implementing Acknowledgement notification suppression.

In FIG. 5, an exemplary embodiment of frame transmission and reception for implementing Acknowledgement notification (ACK) suppression is illustrated. In response to the ICMP echo request from the device 10, the DUT transmits ICMP echo response using the target bandwidth and spatial streams as manipulated according to FIG. 4, however with an operating MCS. The device 10 therefore transmits an ACK with corrupted check-sum so that the DUT 1 discards the ACK and lowers the MCS. The process of transmitting a corrupted ACK is repeated until the DUT 1 lowers its MCS to the target MCS. At this point the device 10 transmits an ACK with valid check-sum in order to analyze the DUT 1 frames normally.

It is important to note that, the method according to the first aspect corresponds to the device according to the second aspect and the test system according to the third aspect. Therefore, the disclosure with regard to any of the aspects is also relevant with regard to the other aspects of the invention.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

What is claimed is:

1. A method for controlling transmission rate of a device under test (DUT) comprising the steps of:
  establishing a connection to the DUT,
  transmitting an operating mode notification in order to adjust at least one of the operating bandwidth or the spatial stream capabilities of the DUT,
  receiving an acknowledgement notification from the DUT regarding the correct reception of the transmitted operating mode notification, withholding the acknowledgement notification transmission until a target modulation and coding scheme are reached, and repeating transmitting a corrupted acknowledgement notification until the DUT lowers its modulation and coding scheme to the target modulation and coding scheme.

2. The method according to claim 1,
wherein the method further comprises the step of comparing the modulation and coding scheme (MCS) obtained from the received acknowledgement notification from the DUT with a target MCS.

3. The method according to claim 2,
wherein the method further comprises the step of transmitting an acknowledgement notification with a corrupted frame check sequence (FCS) in order to influence the MCS.

4. The method according to claim 2,
wherein the method further comprises the step of withholding the acknowledgement notification transmission to the DUT in order to influence the MCS.

5. The method according to claim 2,
wherein the method further comprises the step of transmitting an acknowledgement notification with a valid FCS in order not to influence the MCS.

6. The method according to claim 1,
wherein the method further comprises the step of transmitting an operating mode notification to the DUT in order to reset the operating bandwidth and/or spatial stream capabilities of the DUT.

7. The method according to claim 1,
wherein the connection is established by sending an Internet Control Message Protocol (ICMP) echo request to the DUT and by successively receiving an ICMP echo response from the DUT.

8. The method according to claim 7,
wherein the connection establishment process is repeated periodically.

9. A device for controlling transmission rate of a device under test (DUT) comprising:
a transmitting unit adapted to transmit an operation mode notification to the DUT in order to adjust at least one of the operating bandwidth or the spatial stream capabilities of the DUT,
a receiving unit adapted to receive an acknowledgement notification from the DUT regarding the correct reception of the transmitted operation mode notification,
wherein the transmitting unit is adapted to withhold the acknowledgement notification until a target modulation and coding scheme is reached, and
wherein the transmitting unit is adapted to repeat transmitting a corrupted acknowledgment notification until the DUT lowers its modulation and coding scheme to the target modulation and coding scheme.

10. The device according to claim 9,
wherein the device further comprises a processing unit adapted to compare the modulation and coding scheme (MCS) obtained from the received acknowledgement notification from the DUT with a target MCS.

11. The device according to claim 10,
wherein the transmitting unit is further adapted to transmit an acknowledgement notification with a corrupted frame check sequence (FCS) in order to influence the MCS.

12. The device according to claim 10,
wherein the transmitting unit is further adapted to withhold the acknowledgement notification transmission to the DUT in order to influence the MCS.

13. The device according to claim 10,
wherein the transmitting unit is further adapted to transmit an acknowledgement notification with a valid FCS in order not to influence the MCS.

14. The device according to claim 9,
wherein the transmitting unit is further adapted to transmit an operating mode notification to the DUT in order to reset the operating bandwidth and/or spatial stream capabilities of the DUT.

15. The device according to claim 9,
wherein the device is adapted to establish a connection with the DUT by sending an Internet Control Message Protocol (ICMP) echo request to the DUT and by successively receiving an ICMP echo response from the DUT.

16. The device according to claim 15,
wherein the connection establishment process is repeated periodically.

17. The device according to claim 9,
wherein the device further comprises a memory unit adapted to store the received and target MCS.

18. The device according to claim 9,
wherein the device further comprises a user interface, preferably a graphical user interface, and
wherein the user interface is adapted to receive user data corresponding to the target MCS, target bandwidth and/or target spatial stream capabilities of the DUT.

19. A test system comprising a device of claim 9 and a device under test (DUT) for controlling transmission rate of the DUT.

20. The test system according to claim 19,
wherein the test system operates as a part of a Basic Service Set (BSS) adapted to define a certain operating bandwidth and maximum number of spatial streams.

* * * * *